(12) United States Patent
Duyvesteyn et al.

(10) Patent No.: US 7,811,444 B2
(45) Date of Patent: Oct. 12, 2010

(54) OXIDATION OF ASPHALTENES

(75) Inventors: Willem P. C. Duyvesteyn, Reno, NV (US); Raymond L. Morley, Sparks, NV (US)

(73) Assignee: Marathon Oil Canada Corporation, Calgary, AB (CA)

( * ) Notice: Subject to any disclaimer, the term of this patent is extended or adjusted under 35 U.S.C. 154(b) by 669 days.

(21) Appl. No.: 11/450,591

(22) Filed: Jun. 8, 2006

(65) Prior Publication Data

US 2007/0284283 A1 Dec. 13, 2007

(51) Int. Cl.
*C10G 3/00* (2006.01)
*C10G 17/00* (2006.01)
*C10C 1/00* (2006.01)
*C10C 1/04* (2006.01)

(52) U.S. Cl. ............ 208/4; 208/3; 208/5; 208/6; 208/39; 208/41; 208/42; 208/44; 208/45; 208/177; 208/414; 208/419; 208/421; 208/433; 585/950

(58) Field of Classification Search ............ 208/4, 208/6, 390, 414, 309, 177, 419, 421, 433, 208/45, 3, 5, 39, 41, 42, 44; 585/950
See application file for complete search history.

(56) References Cited

U.S. PATENT DOCUMENTS

| | | | | |
|---|---|---|---|---|
| 1,595,796 | A | * | 8/1926 | Littleford ............... 209/167 |
| 2,337,448 | A | * | 12/1943 | Carr ............... 208/50 |
| 2,343,789 | A | * | 3/1944 | Morris ............... 208/6 |
| 2,453,094 | A | * | 11/1948 | Van Horn et al. ............... 208/4 |
| 3,484,365 | A | * | 12/1969 | Pitchford ............... 208/44 |
| 3,617,505 | A | * | 11/1971 | Cole et al. ............... 208/108 |
| 3,706,341 | A | | 12/1972 | Redford |
| 3,719,589 | A | * | 3/1973 | Herbstman et al. ...... 208/208 R |
| 3,825,066 | A | | 7/1974 | Redford |

(Continued)

FOREIGN PATENT DOCUMENTS

DE 10236791 2/2004

(Continued)

OTHER PUBLICATIONS

Construction Division "Test Procedure for Calculating Viscosity from Penetration" Text-535-C, Texas Department of Transportation—Aug. 1999.*

(Continued)

*Primary Examiner*—Walter D Griffin
*Assistant Examiner*—Huy-Tram Nguyen
(74) *Attorney, Agent, or Firm*—Holland & Hart, LLP

(57) ABSTRACT

A method for processing asphaltenes is disclosed. The method can include separating asphaltenes from an asphaltene-containing composition and oxidizing the separated asphaltenes to form oxidation products. Alternatively, the method can include oxidizing asphaltenes within an asphaltene-containing composition without first separating the asphaltenes. Once formed, the oxidation products can be combined with other hydrocarbons. The amount of oxidation can be limited to an amount sufficient to produce a mixture suitable for the desired application. This method can be used to upgrade asphaltenes from a variety of sources, including oil sands. The oxidation step can be performed, for example, by introducing an oxidizing agent and, in some cases, a catalyst into the asphaltenes. A solvent or miscibility agent also can be introduced to improve mixing between the oxidizing agent and the asphaltenes.

30 Claims, 1 Drawing Sheet

U.S. PATENT DOCUMENTS

| | | | |
|---|---|---|---|
| 3,849,287 A * | 11/1974 | Gleim et al. ................ | 208/430 |
| 3,975,396 A * | 8/1976 | Bushnell et al. ............ | 208/309 |
| 4,035,282 A | 7/1977 | Stuchberry et al. | |
| 4,036,732 A * | 7/1977 | Irani et al. .................. | 208/390 |
| 4,045,313 A * | 8/1977 | Yen et al. .................... | 205/696 |
| 4,046,668 A | 9/1977 | Farcasiu et al. | |
| 4,120,773 A | 10/1978 | Ridgway | |
| 4,120,777 A | 10/1978 | Globus | |
| 4,308,133 A | 12/1981 | Meyer | |
| 4,324,651 A * | 4/1982 | Rollmann et al. ........... | 208/309 |
| 4,338,137 A * | 7/1982 | Goodrich .................. | 106/284.2 |
| 4,341,619 A | 7/1982 | Poska | |
| 4,347,118 A | 8/1982 | Funk et al. | |
| 4,397,736 A | 8/1983 | Low | |
| 4,435,277 A * | 3/1984 | Dinh et al. .................. | 208/108 |
| 4,447,310 A | 5/1984 | Derbyshire et al. | |
| 4,455,216 A | 6/1984 | Angevine et al. | |
| 4,456,523 A * | 6/1984 | Carlos et al. ................... | 208/5 |
| 4,483,761 A | 11/1984 | Paspek | |
| 4,488,866 A * | 12/1984 | Schirmer et al. ............... | 431/4 |
| 4,490,259 A | 12/1984 | Coffing | |
| 4,540,052 A * | 9/1985 | Hitzman .................... | 166/303 |
| RE32,120 E | 4/1986 | Low | |
| 4,589,980 A | 5/1986 | Keys | |
| 4,592,826 A | 6/1986 | Ganguli | |
| 4,596,651 A * | 6/1986 | Wolff et al. ................. | 208/390 |
| 4,612,113 A | 9/1986 | Kallioinen | |
| 4,678,561 A | 7/1987 | Keys | |
| 4,678,562 A | 7/1987 | Keys | |
| 4,719,000 A * | 1/1988 | Beckberger ................. | 208/44 |
| 4,744,890 A | 5/1988 | Miller et al. | |
| 4,772,379 A | 9/1988 | Gomberg | |
| 4,818,373 A | 4/1989 | Bartholic et al. | |
| 4,859,317 A | 8/1989 | Shelfantook et al. | |
| 4,883,581 A * | 11/1989 | Dickakian ................. | 208/48 R |
| 4,956,075 A * | 9/1990 | Angevine et al. ...... | 208/120.05 |
| 4,992,160 A | 2/1991 | Long et al. | |
| 5,143,598 A * | 9/1992 | Graham et al. ............. | 208/390 |
| 5,176,802 A | 1/1993 | Duyvesteyn et al. | |
| 5,223,148 A | 6/1993 | Tipman et al. | |
| 5,232,604 A | 8/1993 | Swallow et al. | |
| 5,236,577 A | 8/1993 | Tipman et al. | |
| 5,284,509 A * | 2/1994 | Kamel et al. ............. | 106/273.1 |
| 5,296,130 A | 3/1994 | Kriz et al. | |
| 5,326,456 A * | 7/1994 | Brons et al. ................... | 208/39 |
| 5,344,553 A | 9/1994 | Shih | |
| 5,389,274 A | 2/1995 | Fernandez | |
| 5,443,158 A | 8/1995 | McKenny et al. | |
| 5,485,883 A | 1/1996 | Rippetoe et al. | |
| 5,496,464 A | 3/1996 | Piskorz et al. | |
| 5,538,081 A | 7/1996 | Rippetoe et al. | |
| 5,554,301 A | 9/1996 | Rippetoe et al. | |
| 5,626,743 A | 5/1997 | Humphreys | |
| 5,626,793 A | 5/1997 | Reiffenrath et al. | |
| 5,670,056 A | 9/1997 | Yoon et al. | |
| 5,702,612 A | 12/1997 | Wang | |
| 5,785,860 A | 7/1998 | Smith | |
| 5,795,466 A | 8/1998 | Kelebek et al. | |
| 5,849,201 A * | 12/1998 | Bradley ....................... | 210/752 |
| 5,876,592 A | 3/1999 | Tipman et al. | |
| 5,961,786 A | 10/1999 | Freel et al. | |
| 5,968,349 A | 10/1999 | Duyvesteyn et al. | |
| 6,007,709 A | 12/1999 | Duyvesteyn et al. | |
| 6,036,849 A | 3/2000 | Rippetoe et al. | |
| 6,060,291 A | 5/2000 | Park et al. | |
| 6,074,558 A | 6/2000 | Duyvestyn et al. | |
| 6,106,787 A | 8/2000 | Rippetoe | |
| 6,214,213 B1 | 4/2001 | Tipman et al. | |
| 6,241,874 B1 * | 6/2001 | Wallace et al. ............... | 208/45 |
| 6,242,165 B1 | 6/2001 | Vaartstra | |
| 6,320,148 B1 | 11/2001 | Yoon et al. | |
| 6,387,278 B1 | 5/2002 | Leif et al. | |
| 6,427,843 B1 | 8/2002 | Clark | |
| 6,458,407 B1 | 10/2002 | Miki et al. | |
| 6,524,469 B1 | 2/2003 | Schucker | |
| 6,533,925 B1 * | 3/2003 | Wallace et al. .............. | 208/309 |
| 6,576,145 B2 | 6/2003 | Conaway et al. | |
| 6,589,417 B2 | 7/2003 | Taciuk et al. | |
| 6,740,785 B2 | 5/2004 | Subramaniam et al. | |
| 6,745,832 B2 | 6/2004 | Wellington et al. | |
| 6,793,079 B2 | 9/2004 | Khan et al. | |
| 6,871,743 B2 | 3/2005 | Yoon et al. | |
| 7,011,749 B2 | 3/2006 | Hayes et al. | |
| 7,115,203 B2 | 10/2006 | Hayes et al. | |
| 2002/0030022 A1 | 3/2002 | Bradley | |
| 2002/0038778 A1 | 4/2002 | Maa et al. | |
| 2003/0102250 A1 * | 6/2003 | Siskin et al. ................ | 208/131 |
| 2003/0150801 A1 * | 8/2003 | Ward et al. .................. | 210/610 |
| 2004/0011746 A1 | 1/2004 | Joussot-Dubien et al. | |
| 2006/0060506 A1 * | 3/2006 | Siskin et al. ................ | 208/131 |
| 2006/0163117 A1 | 7/2006 | Hong | |

FOREIGN PATENT DOCUMENTS

| | | |
|---|---|---|
| WO | WO 98/54098 | 12/1998 |
| WO | WO 01/32936 | 5/2001 |
| WO | WO 03/072506 | 9/2003 |

OTHER PUBLICATIONS

A.V. Shenoy, D. R. Saini, and V.M. Nadkarno, "Rheograms for asphalt from single viscosity measurement", Rheologica Acta, vol. 21, No. 3 (1982).*

Acevedo et al. , "Molecular Weight of Petroleum Asphaltenes", Energy & Fuels 2005, vol. 19, 1548-1560.*

Hong and Chao, "A Polar-Nonpolar, Acetic Acid/Heptane, Solvent Medium for Degradation of Pyrene by Ozone," Ind. Eng. Chem. Res. 43:7710-7715 (2004).

Benito, A.M; Martinez, M.T; Fernandez, I; Miranda, J.L., 1996 Upgrading of an Asphaltenic Coal Residue: Thermal Hydroprocessing. Energy & Fuels, 10(2), 401-8.

Clark, Peter D.; Kirk, Martin J., Studies on the Upgrading of BituminousOils with Water and Transition metal Catalysts. Energy & Fuels, 1994 8(2), 380-7.

Dehkissia, Soumaine; Larachi, Faical; Chornet, Esteben, 2004 Catalytic (Mo) upgrading of Athabasca bitumen vacuum bottoms via two-step hydrocracking and enhancement of Mo-heave oil interaction. Fuel, 83 (10), 1323-1331.

Demirbas, Ayhan, Recovery of asphaltenes from tar sand by supercritical fluid extraction. Petroleum Science and Technology, 2000, 18 (7&8), 771-781.

Garcia-Arellano Humberto; Buenrostro-Gonzalez Eduardo; Vazquez- Duhalt Rafael, Biocatalytic transformation of petroporphyrins by chemical modified cytochrome C. Biotechnology and bioengineering, 2004, 85 (7), 790-8.

Jamaluddin, A.K.M.; Nazarko, T.W.; Sills, Suzanne; Fuhr, B.J., Deasphalted oil—natural asphaltene solvent. Proceedings—International Symposium on Oilfield Chemistry, San Antonio, Feb. 1995, 14-17, 513-522. Society of Petroleum Engineers, Richardson, TX.D.

Kamimura, H.; Takahashi, S.; Kishita, A.; Moriya, T.; Hong Enomoto, Upgrading of bitumen with supercritical water for a system combined with SAGD. Symposia-American Chemical Society, Division of Fuel Chemistry, 1998, 43(3), 741-745.

Kishita, Astushi; Takahashit, Satoru, Kammura, Hirotaka; Miki, Masami; Moriya, Takehiko, Enomoto, Huel., Upgrading of bitumen by hydrothermal visbreaking in supercritical water with alkalki, Journal of the Japan Petroleum Institute, 2003, 46 (4), 215-221.

Moschopedies, Speros E.; Speight, James G., Oxidation of a bitumen in relation to its recovery from tar sand formations. American Chemical Society, Division of Fuel Chemistry, 1974, 19 (2), 192-201.

Nelson, William, M.; Puri, Ishwar K., Oxidation of CH3CH0 by 03 and H2O2 Mixtures in Supercritical C02 in Perfectly Stirred Reactor. Industrial & Engineering Chemistry Research, 1997, 36(9), 3446-3452.

Ovalles, Cesar; Rengel-Unda, Pablo; Bruzual, Jenny; Salazar, Arelys, Upgrading of extra-heavy crude using hydrogen donor under steam injection conditions, characterization by pyrolysis GC-MS of the asphaltenes and effects of a redical initiator. American Chemical Society, Division of Fuel Chemistry, 2003, 48(1), 59-60.

Rahimi, Parviz M.; Parker, Richard, J.; Gentzis, Thomas; Tsaprailis, Harry, Processability of partially deasphalted Athabasca bitumen. Abstracts, 221st ACS National Meeting, San Diego, CA, United States, Apr. 1-5, 2001, PETR-005.

Rose, J.L; Monnery, W.D.: Chong, K; Svrcek, W.Y., Experimental Data for the extraction of Peace River bitumen using supercrital ethane, fuel, 2001, 80(8), 1101-1110.

Sadeghi, Kazem M.: Lin Jiunn-Ren; Yen, The Fu.; Sonochemical treatment of fossil fuels. Energy Sources 1994, 16(3), 439-49.

Sadeghi, Kazem M.; Lin, Jiunn-Ren; Yen, The Fu., Sonochemical treatment of fuel components. American Chemical Society, Division of Fuel Chemistry, 1992, 37(1), 86-91.

Sato, Takafumi; Adschiri, Tadafumi; Arai, Kunio; Rempel, Garry L.; Ng, Flora TT., Upgrading of asphalt with and without partial oxidation in supercritical water. Fuel 203, 82 (10), 1321-1239.

Scott, C.E.; Delgado, O; Bolivar, C; Ovalles, C.; Upgrading of Hamaca crude oil using formic acid as hydrogen precursor under steam injection conditions. American Chemical Society, Division of Fuel Chemistry, 2003, 48(1), 52-53.

Scott, D.S.; Radlein, D.; Piskorz, J.; Majerski, P.; Debruijn, T.J.W., Upgrading of bitumen in supercritical fluids, Fuel, 2001, 80 (8), 1087-1099.

Strausz, Otto P.; Mojelsky, Thomas W.; Payzant, John D.; Olah George;A.; Prakash. G.K. Surya, Upgrading of Alberta heavy oils by superacid-catalyzed hydrocracking. Energy and Fuels, 1999, 13(3), 558-569.

Subramanian, M; Hanson, F.V., Supercritcal fluid extraction of bitumens from Utah oil sands. Fuel Processing Technology, 1998, 55(1), 35-53.

Wang, Jiquian; Deng, Wenan, Que, Guohe, Upgrading of residue oil slurry bed hydrocracking bottom oils by solvent processing. Preprints—American Chemical Society, Division of Petroleum Chemistry, 2003, 48-(4), 344-347.

Wang, Jinsheng; Anthony, Edward J., A study of thermal-cracking behavior of asphaltenes. Chemical Engineering Science, 2003, 58(1), 157-162.

Xia, T.X.; Greaves, M., Upgrading Athabasca tar sand using Toe-to-Heel Air Injection. Journal of Canadian Petroleum Technology, 2003, 41(8), 51-57.

Cesar Ovalles, et al., Downhole Upgrading of Extra-heaving Crude Oil Using Hydrogen Donors and Methane Under Steam Injection Conditions, Petroleum Science and Technology, 2003, vol. 21, Nos. 1&2, pp. 255-274.

* cited by examiner

OXIDATION OF ASPHALTENES

FIELD

This disclosure relates generally to the processing of asphaltenes, such as by oxidation.

BACKGROUND

Asphaltenes are high molecular weight hydrocarbons having a chemical structure that can include stacked sheets of fused aromatic rings. Due to their high molecular weight (e.g., greater than about 1,000 daltons) asphaltenes are found within the least volatile fraction after distillation of crude oil. Asphaltenes also can be found in oil sands along with minerals and other hydrocarbons.

High molecular weight hydrocarbons, such as asphaltenes, typically are not suitable for use as fuel oil (e.g., as a replacement for diesel fuel used in the transportation industry), as a solvent to reduce the viscosity of other fluids so that they can be transported through a pipeline, or as feedstock for the production of petroleum-derived organic chemicals. Conventionally, the high molecular weight hydrocarbons produced during refinement processes are either discarded or broken down into lower molecular weight hydrocarbons using a process generally known as "cracking." For example, hydrogen can be added (e.g., by subjecting the high molecular weight hydrocarbons to a hydrotreating process) or carbon can be subtracted (e.g., by subjecting the high molecular weight hydrocarbons to a coking process). Hydrotreating typically includes reacting the high molecular weight hydrocarbons at high pressures in the presence of catalysts. Coking typically includes breaking down the high molecular weight hydrocarbons into two or more fractions, such as a light paraffinic or aromatic liquid fraction and a heavy solid coke fraction.

Conventional cracking processes can be used to derive value from high molecular weight hydrocarbons, but they typically are expensive due to high energy demands and the cost of capital equipment and catalysts. With regard to the heaviest fraction, which requires the most processing, conventional cracking processes often prove to be uneconomical. In addition, conventional cracking processes typically are ineffective at breaking down large asphaltene molecules and often result in the precipitation of such molecules or in the production of petroleum coke.

Although cracking processes have not been developed specifically for use on asphaltenes, some processes have been developed for use on asphaltene-containing heavy hydrocarbon mixtures. These processes include the Taciuk kiln process (as shown, for example, in U.S. Pat. No. 6,589,417) and non-Taciuk pyrolysis (as shown, for example, in U.S. Pat. No. 5,961,786). Both of these processes involve endothermic reactions that require significant energy. Typically, these processes burn a portion of the hydrocarbons to sustain the reactions. The remainder often is less than 50% of the original material. Moreover, carrying out these processes usually requires the use of furnaces and other expensive capital equipment.

Some references disclose the oxidation of aromatic hydrocarbons, including polycyclic aromatic hydrocarbons, in the context of remediation. These references include U.S. Pat. No. 5,849,201 (the '201 patent) and International Patent Publication No. WO 01/32936 (the '936 publication). The '201 patent discloses the "rapid remediation of aromatic hydrocarbons, and especially polycyclic aromatic hydrocarbons (PAHs), in contaminated materials, such as soils, sludges, tars, sands and liquids using catalysts in conjunction with ozone, oxidants and surfactants." The '936 publication discloses the remediation of PAHs by chemical oxidation followed by biological treatment. The processes disclosed in these references involve total oxidation of aromatic hydrocarbons into very low molecular weight products, such as carbon dioxide. Since virtually all of the energy contained in the aromatic hydrocarbons is consumed, these processes generally are not suitable for use in upgrading asphaltenes to form useful hydrocarbon products.

SUMMARY

Disclosed herein are embodiments of a method for processing asphaltenes, such as by oxidation. Oxidation of the asphaltenes can be performed, for example, at a relatively mild temperature, such as a temperature from about 25° C. to about 95° C. The pressure also can be near ambient.

In some embodiments, the asphaltenes are separated from an asphaltene-containing composition prior to oxidation. The separated asphaltenes can comprise, for example, from about 0% to about 30% non-asphaltene hydrocarbons prior to being oxidized. In other embodiments, the asphaltenes are oxidized within the asphaltene-containing composition. Oxidation products resulting from the oxidation of the separated asphaltenes can be combined with any other desired hydrocarbons or combinations of hydrocarbons to form useful compositions, such as fuel oil and feedstock for the production of petroleum-derived organic chemicals. The disclosed embodiments can be performed as batch or semi-batch processes or substantially continuously. In some embodiments, the asphaltene-containing composition is oil sand. For example, asphaltenes can be processed within or separated from a mixture of hydrocarbons derived from oil sand. The other hydrocarbons in the mixture of hydrocarbons also can be broken down into more useful products. For example, these other hydrocarbons can be separately broken down and then combined with one or more of the asphaltene oxidation products. Alternatively, the asphaltene oxidation products can be mixed with the other hydrocarbons before the other hydrocarbons are processed. The asphaltene oxidation products may act as a solvent to reduce the viscosity of the other hydrocarbons, such as to allow the other hydrocarbons to be transported through a pipeline.

Oxidation of the asphaltenes can proceed to a degree that is effective to facilitate use or further processing of the asphaltenes, but that does not result in complete oxidation of the asphaltenes to solely carbon oxides, such as carbon monoxide and carbon dioxide. There are various methods for assessing the degree of oxidation. For example, oxidation of the asphaltenes can include breaking from about 2% to about 50% of the aromatic rings in the asphaltenes. Similarly, the average molecular weight of the oxidation products can be, for example, from about 10% to about 50% of the average molecular weight of the asphaltenes.

In some embodiments, oxidation includes introducing an oxidizing agent into the asphaltenes. Oxidation also can include microbial oxidation of the asphaltenes. A catalyst also can be added to catalyze oxidation of the asphaltenes. Suitable oxidizing agents for use in various embodiments include, for example, permanganate compounds, cerium compounds, chromate compounds, dichromate compounds, peroxide compounds, ozone, tetroxide compounds, nitrate compounds, nitrite compounds, persulfate compounds, peroxy acids, halogen-containing compounds (e.g., hypochlorite, chlorite, chlorate, perchlorate and analogous halogen-containing compounds) and derivatives and combinations thereof. Oxidation also can include introducing Fenton's Reagent into the asphaltenes. Suitable catalysts include catalysts comprising vanadium, titanium, tungsten, molybdenum, ruthenium and combinations thereof. For example, suitable catalysts can comprise oxides of these elements. The oxidizing agent can be introduced at any amount sufficient to achieve the desired result. For example, the oxidizing agent can be introduced at a molar ratio between about 0.01 part oxidizing agent to 1 part asphaltenes and about 0.5 part oxidizing agent to 1 part asphaltenes.

When introduced into an asphaltene-containing composition, the oxidizing agent can be selected to preferentially oxidize the asphaltenes over other hydrocarbons in the composition. Useful oxidizing agents for preferentially oxidizing the asphaltenes include persulfate compounds, peroxy acids, periodic acids, ozone, and derivatives and combinations thereof. Useful catalysts for catalyzing the preferential oxidation of asphaltenes include catalysts comprising ruthenium. For example, suitable catalysts can comprise oxides of ruthenium.

The oxidation products resulting from oxidation of the asphaltenes may, and typically do, have a viscosity lower than the viscosity of the asphaltenes prior to oxidation. In some embodiments, the viscosity of the asphaltenes is measured to determine a quantity of oxidizing agent to be added to the asphaltenes. For example, the viscosity of the asphaltenes can be measured while introducing the oxidizing agent or between the introduction of aliquots of the oxidizing agent.

The oxidizing agent and the asphaltenes may be mixed by any suitable methods. For example, a solvent or miscibility agent can be introduced into the asphaltenes prior to or while oxidizing the asphaltenes. The solvent or miscibility agent can include, for example, citric acid, formic acid, an alkyl ester, a dialkyl ether, an alcohol or a derivative or combination thereof. In some embodiments, the solvent or miscibility agent is introduced at a molar ratio between about 0.02 part solvent or miscibility agent to 1 part asphaltenes and about 0.2 part solvent or miscibility agent to 1 part asphaltenes. The oxidation products also may act as a solvent or miscibility agent for the asphaltenes and the oxidizing agent. For example, in some embodiments, the oxidation products include one or more fatty acid, ester or ketone.

DETAILED DESCRIPTION

Figure 1:
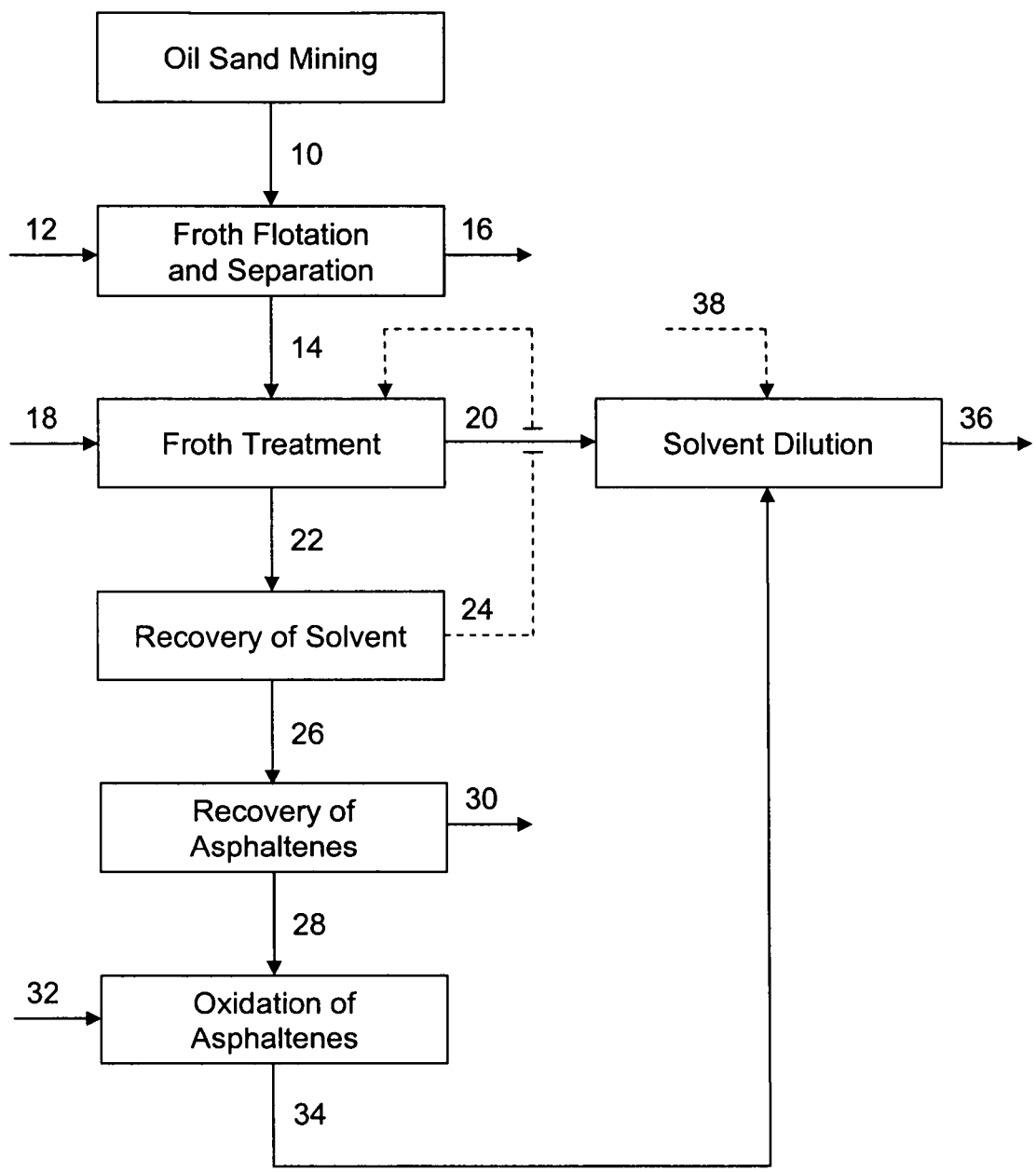
FIG. 1 is a schematic diagram representing embodiments of a method for processing oil sands, including oxidation of separated asphaltenes to produce a solvent for transporting a non-asphaltene hydrocarbon component of the oil sands.

Unless otherwise explained, all technical and scientific terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. The term "includes" means "comprises." The method steps described herein, such as the separation steps and the mixing steps, can be partial, substantial or complete unless indicated otherwise.

Disclosed herein are embodiments of a method for processing asphaltenes. Asphaltenes are found within many natural materials, including crude oil and oil sands. Although historically difficult to process using conventional methods, asphaltenes are a rich source of energy. Embodiments of the disclosed method can be used to process asphaltenes to form more useful products. Many of these embodiments are particularly well suited for processing asphaltenes within oil sands.

Some embodiments of the disclosed method include oxidizing asphaltenes to produce lower molecular weight oxidation products. The oxidization products typically are in a form suitable for use as fuel oil (e.g., as a replacement for diesel fuel used in the transportation industry), as a solvent to reduce the viscosity of other fluids so that they can be transported through a pipeline, or as feedstock for the production of petroleum-derived organic chemicals. For example, the oxidation products typically have a lower boiling point and a lower viscosity than the asphaltenes from which they were derived.

A variety of techniques can be used to oxidize asphaltenes. In some embodiments, an oxidizing agent is introduced into the asphaltenes. Suitable oxidizing agents include, for example, permanganate compounds, cerium compounds, chromate compounds, dichromate compounds, peroxide compounds, ozone, tetroxide compounds, nitrate compounds, nitrite compounds, persulfate compounds, peroxy acids, halogen-containing compounds (e.g., hypochlorite, chlorite, chlorate, perchlorate and analogous halogen-containing compounds) and derivatives and combinations thereof. The oxidizing agent can be introduced at any amount sufficient to achieve the desired result. For example, the oxidizing agent can be introduced at a molar ratio between about 0.005 part oxidizing agent to 1 part asphaltenes and about 1 part oxidizing agent to 1 part asphaltenes, such as between about 0.01 part oxidizing agent to 1 part asphaltenes and about 0.5 part oxidizing agent to 1 part asphaltenes or between about 0.05 part oxidizing agent to 1 part asphaltenes and about 0.25 part oxidizing agent to 1 part asphaltenes.

Oxidation of asphaltenes also can include adding a catalyst or a reagent comprising a catalyst. Suitable catalysts include catalysts comprising vanadium, titanium, tungsten, molybdenum, ruthenium and combinations thereof. In some embodiments, the catalysts are metal oxides, such as oxides of vanadium, titanium, tungsten, molybdenum or ruthenium. Suitable reagents comprising a catalyst include Fenton's Reagent.

Excess heat typically is not required to carry out the oxidation of asphaltenes in embodiments of the disclosed method. The activity of certain oxidizing agents, however, may be facilitated by mild heating. For example, in some embodiments, the oxidation of asphaltenes is carried out at a temperature sufficiently elevated to facilitate oxidation. This can be a temperature, for example, from about 25° C. to about 250° C., such as from about 25° C. to about 95° C. or from about 35° C. to about 65° C.

Some disclosed embodiments include the use of microbial oxidation. For example, an enzyme and live organisms can be added to asphaltenes within or separated from an asphaltene-containing composition. Microbial oxidation processes often are more selective than other oxidation processes. Thus, it also may be possible to preferentially oxidize asphaltenes within a mixture of hydrocarbons. Suitable organisms for the preferential oxidation of asphaltenes include bacteria (e.g., *Pseudomonas, Aeromonas, Moraxella* and *Flavobacteria*), fungi (e.g., *Oomycetes, Zygomycota* and *Ascomycota*) and microalgae (e.g., *Porphyridium, Diatoms, Chlorella* and *Dunaliella*).

Since asphaltenes typically are viscous, a solvent or miscibility agent can be added to facilitate mixing between the asphaltenes and the oxidizing agent. Asphaltenes are hydrophobic, whereas most oxidizing agents are hydrophilic. Therefore, some suitable solvents and miscibility agents include both hydrophilic and hydrophobic portions. Suitable solvents and miscibility agents include, for example, citric acid, formic acid, alkyl esters, dialkyl ethers, alcohols (e.g., methanol and ethanol) and derivatives and combinations thereof. The solvent or miscibility agent can be introduced, for example, at a molar ratio between about 0.01 part solvent or miscibility agent to 1 part asphaltenes and about 1 part solvent or miscibility agent to 1 part asphaltenes, such as between about 0.02 part solvent or miscibility agent to 1 part asphaltenes and about 0.2 part solvent or miscibility agent to 1 part asphaltenes or between about 0.05 part solvent or miscibility agent to 1 part asphaltenes and about 0.1 part solvent or miscibility agent to 1 part asphaltenes.

In some embodiments, certain oxidation products may act as solvents or miscibility agents that facilitate mixing between the asphaltenes and the oxidizing agent. For example, the oxidation products can include fatty acids, esters or ketones, which have both hydrophilic and hydrophobic portions. The formation of these products may reduce the need for added solvent or miscibility agent. To maximize this benefit, some embodiments include processing the asphaltenes in a substantially continuous process in which new oxidation products are substantially continuously formed to act as solvents or miscibility agents for further oxidation. Of course, the process also can be performed as a batch or semi-batch process.

Oxidation may reduce the energy value of asphaltenes. Thus, in some disclosed embodiments, the degree of oxidation is limited to an amount sufficient to form useful products. Limiting the oxidation provides controlled product formation and reduces processing costs. In some disclosed embodiments, oxidation includes breaking from about 1% to about 95% of the aromatic rings in the asphaltenes, such as from about 2% to about 50% or from about 5% to about 25%. The average molecular weight of the oxidation products can be from about 5% to about 75% of the average molecular weight of the asphaltenes, such as from about 10% to about 50% or from about 15% to about 30%.

The degree of oxidation can be controlled, for example, by controlling the quantity of oxidizing agent added to the separated asphaltenes. In some embodiments, the oxidizing agent is introduced into the separated asphaltenes slowly while the physical properties of the mixture are monitored. For example, a certain quantity of oxidizing agent can be added followed by mixing and a measurement of a physical property of the mixture, such as the viscosity of the mixture. This process then can be repeated until the desired degree of oxidation is achieved.

If added to a mixture of hydrocarbons including low molecular weight hydrocarbons in addition to asphaltenes, certain oxidizing agents will preferentially oxidize the low molecular weight hydrocarbons before the asphaltenes. Low molecular weight hydrocarbons typically are already in a usable form, so oxidizing these materials is not desirable. Therefore, some embodiments of the disclosed method include separating asphaltenes from other hydrocarbons prior to oxidation. For example, some embodiments include separating a hydrocarbon mixture from oil sand and then separating asphaltenes from this hydrocarbon mixture. Information regarding these separation steps can be found, for example, in U.S. Pat. No. 6,007,709 and U.S. patent application Ser. No. 11/371,327 (the '327 application), which are incorporated herein by reference. The separated asphaltenes can comprise, for example, from about 0% to about 40% non-asphaltene hydrocarbons prior to being oxidized, such as from about 0% to about 30% or from about 0% to about 20%.

After being separated, the asphaltenes can be oxidized to form oxidation products, which then can be combined with other hydrocarbons, such as other hydrocarbons from the hydrocarbon mixture. These other hydrocarbons may undergo separate processing, if necessary. In some embodiments, the oxidation products are mixed with other hydrocarbons as a solvent to reduce the viscosity of the other hydrocarbons. This can be useful if the other hydrocarbons are viscous and need to be transported through a pipeline. For example, the bitumen separated from oil sands typically is viscous and must be mixed with a solvent before being transported through a pipeline. The oxidation products can take the place of all or a portion of the solvent.

FIG. 1 shows one example of a method for processing oil sands. The method begins with oil sand mining. Oil sand 10 resulting from the oil sand mining is transported to a treatment location where it undergoes froth flotation and separation, which typically involves mixing the oil sand with hot water 12 to form a mixture and then introducing gas into the mixture. The hydrocarbons rise with bubbles of the gas to produce a hydrocarbon-rich froth 14 over a hydrocarbon-depleted aqueous phase 16. The hydrocarbon-depleted aqueous phase 16 is sent to disposal or further treatment. The hydrocarbon-rich froth 14 is mixed with a paraffinic hydrocarbon solvent 18 and subjected to one or more settling stages. The paraffinic hydrocarbon solvent 18 causes precipitation of asphaltenes in the mixture. After settling, bitumen 20 is separated from a tailings stream 22 comprising precipitated asphaltenes, residual solids, residual water and solvent. The tailings stream 22 then flows into a tailings solvent recovery unit (TSRU), which separates a recovered solvent stream 24 from a TSRU tailings stream 26. The recovered solvent stream 24 can be recycled back to the froth treatment stage.

The TSRU tailings stream 26 typically includes asphaltenes, minerals, water and some residual solvent. The asphaltenes 28 can be recovered by the one of the processes disclosed in the '327 application. Such processes can include flotation, gravity settling and/or hydrophobic agglomeration. These processes result in the separation of minerals 30. Once separated, the asphaltenes 28 are mixed with an oxidizing agent 32 to produce oxidation products 34. The oxidation products 34 have a reduced viscosity and can act as a solvent for the bitumen 20. The oxidation products 34 are mixed with the bitumen 20 to form a diluted bitumen mixture 36 with a sufficiently low viscosity to be transported through a pipeline. If additional viscosity reduction is required, a return solvent 38 can be mixed into the diluted bitumen mixture 36.

Asphaltenes also can be oxidized without first being separated from other hydrocarbons. In such embodiments, it can be useful to use an oxidizing agent that preferentially oxidizes the asphaltenes over the other hydrocarbons. A catalyst also can be used to promote the preferential oxidation of asphaltenes over the other hydrocarbons. Examples of oxidizing agents that are well-suited for preferentially oxidizing asphaltenes include strongly electrophilic oxidizing agents, such as persulfate compounds, peroxy acids, periodic acids, ozone, and derivatives and combinations thereof. Examples of catalysts that are useful for catalyzing the preferential oxidation of asphaltenes include catalysts comprising ruthenium. For example, suitable catalysts can comprise oxides of ruthenium.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for processing asphaltenes, comprising:
separating asphaltenes from an asphaltene-containing composition, including forming a separated asphaltenes composition comprising at least 60 wt % asphaltene; and
adding an oxidizing agent into the separated asphaltenes composition and oxidizing the separated asphaltenes composition, including forming predominantly oxidation products having an average molecular weight in the range of from about 5% to about 75% of the average molecular weight of the asphaltene in the separated asphaltenes composition;
wherein at least one of the oxidation products acts as a solvent or miscibility agent for the separated asphaltenes composition and the oxidizing agent.

2. The method according to claim 1 wherein the asphaltene-containing composition is oil sand.

3. The method according to claim 1 performed substantially continuously.

4. The method according to claim 1 further comprising combining the oxidation products with other hydrocarbons.

5. The method according to claim 1 wherein the separated asphaltenes composition has a viscosity greater than a viscosity of the oxidation products.

6. The method according to claim 1 wherein oxidizing comprises breaking from about 2% to about 50% of the aromatic rings in the asphaltene of the separated asphaltenes composition.

7. The method according to claim 1 wherein the average molecular weight of the oxidation products is from about 10% to about 50% of the average molecular weight of the asphaltene in the separated asphaltenes composition.

8. The method according to claim 1 wherein the oxidizing agent comprises a permanganate compound, a cerium compound, a chromate compound, a dichromate compound, a peroxide compound, ozone, a tetroxide compound, a nitrate compound, a nitrite compound, a persulfate compound, a peroxy acid, a halogen-containing compound or a derivative of combination thereof.

9. The method according to claim 1 wherein oxidizing further comprises introducing a catalyst into the separated asphaltenes composition, the catalyst comprising vanadium, titanium, tungsten, molybdenum, ruthenium or a combination thereof.

10. The method according to claim 1 wherein oxidizing further comprises introducing Fenton's Reagent into the separated asphaltenes composition.

11. The method according to claim 1 wherein the oxidizing agent is introduced at a molar ratio between about 0.01 part oxidizing agent to 1 part asphaltenes and about 0.5 part oxidizing agent to 1 part asphaltenes.

12. The method according to claim 1 wherein the method further comprises measuring the viscosity of the separated asphaltenes composition and determining a quantity of oxidizing agent to be added to the separated asphaltenes composition based on the viscosity measured in the measuring step.

13. The method according to claim 1 wherein the method further comprises measuring the viscosity of the separated asphaltenes composition while introducing the oxidizing agent into the separated asphaltenes composition or between the introduction of aliquots of the oxidizing agent into the separated asphaltenes composition.

14. The method according to claim 1 further comprising introducing a solvent or miscibility agent into the separated asphaltenes composition prior to or while oxidizing the separated asphaltenes composition, the solvent or miscibility agent comprising citric acid, formic acid, an alkyl ester, a dialkyl ether, an alcohol or a derivative of combination thereof.

15. The method according to claim 1 further comprising introducing a solvent or miscibility agent into the separated asphaltenes composition prior to or while oxidizing the separated asphaltenes composition, the solvent or miscibility agent being introduced at a molar ratio between about 0.02 part solvent or miscibility agent to 1 part asphaltenes and about 0.2 part solvent or miscibility agent to 1 part asphaltenes.

16. The method according to claim 1 wherein the oxidation products comprise one or more fatty acid, ester or ketone.

17. The method according to claim 1 wherein oxidizing the separated asphaltenes composition comprises oxidizing the separated asphaltenes composition at a temperature from about 25° C. to about 95° C.

18. The method according to claim 1 wherein oxidizing the separated asphaltenes composition comprises oxidizing the separated asphaltenes composition by a microbial oxidation process.

19. The method according to claim 1 wherein the separated asphaltenes composition comprises from about 0% to about 30% non-asphaltene hydrocarbons prior to being oxidized.

20. The method according to claim 1 wherein separating asphaltenes from an asphaltene-containing composition comprises froth flotation.

21. A method for processing oil sand, comprising:
separating a mixture of hydrocarbons from oil sand;
separating asphaltenes from other hydrocarbons in the mixture of hydrocarbons, including forming a separated asphaltenes composition comprising at least 60 wt % asphaltene;
oxidizing the separated asphaltenes composition, including forming predominantly oxidation products having an average molecular weight in the range of from about 5% to about 75% of the average molecular weight of the asphaltene in the separated asphaltenes composition; and
combining the oxidation products with the other hydrocarbons;
wherein the oxidation products act as a solvent reducing the viscosity of the other hydrocarbons.

22. The method according to claim 21 performed substantially continuously.

23. The method according to claim 21 wherein oxidizing comprises breaking from about 2% to about 50% of the aromatic rings in the asphaltene of the separated asphaltenes composition.

24. The method according to claim 21 wherein the average molecular weight of the oxidation products is from about 10% to about 50% of the average molecular weight of the asphaltene in the separated asphaltenes composition.

25. The method according to claim 21 wherein oxidizing comprises introducing an oxidizing agent into the separated asphaltenes composition, the oxidizing agent comprising a permanganate compound, a cerium compound, a chromate compound, a dichromate compound, a peroxide compound, ozone, a tetroxide compound, a nitrate compound, a nitrite compound, a persulfate compound, a peroxy acid, a halogen-containing compound or a derivative of combination thereof.

26. The method according to claim 21 wherein oxidizing comprises introducing a catalyst into the separated asphaltene composition, the catalyst comprising vanadium, titanium, tungsten, molybdenum, ruthenium or a combination thereof.

27. The method according to claim 21 wherein oxidizing comprises introducing Fenton's Reagent into the separated asphaltenes composition.

28. The method according to claim 21 further comprising introducing a solvent or miscibility agent into the separated asphaltenes composition prior to or while oxidizing the separated asphaltenes composition, the solvent or miscibility agent comprising citric acid, formic acid, an alkyl ester, a dialkyl ether, an alcohol or a derivative of combination thereof.

29. The method according to claim 21, wherein combining the oxidation products with the other hydrocarbons forms a mixture and the method further comprises transporting the mixture through a pipeline.

30. The method according to claim 21 wherein separating a mixture of hydrocarbons from oil sand comprises froth flotation.

\* \* \* \* \*